United States Patent
Righi et al.

(10) Patent No.: US 9,691,191 B1
(45) Date of Patent: Jun. 27, 2017

(54) METHODS AND SYSTEMS FOR AUTOMATED REAL TIME CONTINUOUS WAVEFORM ELECTRICAL PROPERTY MONITORING AND STATUS REPORTING

(75) Inventors: Luigi P. Righi, Laguna Hills, CA (US); Brian A. Hansen, Huntington Beach, CA (US); Gregory M. Wellbrook, Long Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 390 days.

(21) Appl. No.: 13/030,975

(22) Filed: Feb. 18, 2011

(51) Int. Cl.
*G07C 5/00* (2006.01)

(52) U.S. Cl.
CPC .................................. *G07C 5/008* (2013.01)

(58) Field of Classification Search
CPC .. H04B 7/18506; H04B 1/0466; G07C 5/008; H04L 41/069
USPC ........................ 702/66, 79; 455/431, 98, 345
See application file for complete search history.

(56) References Cited

U.S. PATENT DOCUMENTS

| | | | |
|---|---|---|---|
| 5,111,402 A * | 5/1992 | Brooks ................ | G01R 31/008 324/73.1 |
| 6,992,403 B1 * | 1/2006 | Raad ...................... | F02C 7/275 290/10 |
| 7,356,336 B2 * | 4/2008 | Perez et al. .................... | 455/431 |
| 7,415,372 B2 * | 8/2008 | Taenzer et al. ................. | 702/72 |
| 2010/0194576 A1 * | 8/2010 | Bertness ............ | G01R 31/3627 340/636.1 |

OTHER PUBLICATIONS

Hannu, Jari et al., An Embedded Test & Health Monitoring Strategy for Detecting and Locating Faults in Aerospace Bus Systems, 2008, 6 pgs, IEEE, Italy.
Alta Data Technologies XMC-MA4 Multi-Channel, Multi-Protocol 1553 and ARINC Interface for XMC Systems data sheet, p. 1-2, Rio Rancho, NM.

* cited by examiner

*Primary Examiner* — Gregory J Toatley
*Assistant Examiner* — Yoshihisa Ishizuka
(74) *Attorney, Agent, or Firm* — Armstrong Teasdale LLP

(57) ABSTRACT

A method for performing an integrated waveform analysis without the use of an external device is disclosed. The method includes receiving, at a processing device, at least one electrical waveform associated with a communications bus, extracting, with the processing device a plurality of real time parametric measurements of voltage samples for the at least one electrical waveform, comparing, with the processing device, the parametric measurements of voltage samples to stored data that is accessible to the processing device, the stored data related to expected electrical signal characteristics for the communications bus proximate at least one of system interfaces, hardware components, and interconnections associated with the communications bus, distinguishing any system interconnection degradations and hardware failures associated with the communications bus based on said comparing, and reporting, via the processing device, at least one of: extracted electrical signal parametric measurements are consistent with the stored electrical signal characteristics, electrical signal parameters are indicative of a system interconnection degradation, and electrical signal parameters are indicative of a hardware failure.

18 Claims, 5 Drawing Sheets

METHODS AND SYSTEMS FOR AUTOMATED REAL TIME CONTINUOUS WAVEFORM ELECTRICAL PROPERTY MONITORING AND STATUS REPORTING

BACKGROUND

The field of the disclosure relates generally to parametric waveform measurements, and more specifically, to methods and systems for automated real time continuous waveform electrical property monitoring and status reporting.

Qualitative waveform analysis is sometimes required to determine proper operation of an electrical or electronic system or a system of such systems. For example, modern aircraft are configured with a multitude of systems that perform various tasks relating to operation of the aircraft. Such systems include, navigation, fuel monitoring, altitude sensors, communications, radar, autopilot, and in the case of military aircraft, various weapons and defense systems to name a very few. Such systems are generally made up of one or more components that operate together as a system and are typically programmed to provide the flight crew with one or more displays that provide status, and allow for flight crew input. Many of these systems communicate data to one another across one or more communications bus that are generally referred to as avionics buses. Components of such modern aircraft also include a host of indicators whose conditions are set based on the data transmitted (and received) across these avionics buses. In summary, the number of electrical signals and waveforms that are present in a modern aircraft is extensive.

More specifically, these aircraft systems generate and receive electrical signals and communicate with one another using the above mentioned plurality of avionics buses. Each of these avionics buses incorporates a communications protocol. Generally, this protocol includes a signal specification defining the electrical characteristics of such communications signals. Specifically, the electrical signals that are transmitted and received along such buses should meet or exceed the defined signal specification. Such specifications define, for example, signal frequency, peak voltage, and rise and fall times to name a few.

BRIEF DESCRIPTION

In one aspect, a method for performing an integrated waveform analysis without the use of an external device is provided. The method includes receiving, at a processing device, at least one electrical waveform associated with a communications bus, extracting, with the processing device a plurality of real time parametric measurements of voltage samples for at least one electrical waveform, comparing, with the processing device, the parametric measurements of voltage samples to stored data that is accessible to the processing device, the stored data related to expected electrical signal characteristics for the communications bus proximate at least one of system interfaces, hardware components, and interconnections associated with the communications bus, distinguishing any system interconnection degradations and hardware failures associated with the communications bus based on said comparing, and reporting, via the processing device, at least one of: extracted electrical signal parametric measurements are consistent with the stored electrical signal characteristics, electrical signal parameters are indicative of a system interconnection degradation, and electrical signal parameters are indicative of a hardware failure.

In another aspect, a unit for analyzing electrical signal conditions associated with a communications bus is provided. The unit includes a communications interface for communicatively coupling the unit to the communications bus, a storage device for storing data related to electrical signal levels that should be present on the communications bus proximate at least one of system interfaces, hardware components, and interconnections associated with the communications bus, a processing device programmed to receive, via said communications interface, electrical waveforms associated with the communications bus, extract real time parametric measurements of voltage samples for the received electrical waveform, and compare the real time parametric measurements of voltage samples to the stored data within the storage device to determine the existence of system interconnection degradations and hardware failures, if any, associated with the communications bus.

In still another aspect, a method is provided that includes receiving, with a processing device, electrical signals associated with a communications bus, comparing, with the processing device, the electrical characteristics of the received electrical signals with electrical signal characteristics stored in a memory associated with the processing device, and providing, to an external device, an analysis of the comparison between the received electrical signals and the electrical signal characteristics stored in the memory to determine if the received electrical signals are appropriate to a functional specification for the communications bus.

The features, functions, and advantages that have been discussed can be achieved independently in various embodiments or may be combined in yet other embodiments further details of which can be seen with reference to the following description and drawings.

DETAILED DESCRIPTION

Many of the line replaceable units (LRUs) in a modern aircraft communicate data to one another over one or more communications buses. A suite of LRUs and their supporting components may be referred to as a system of systems. As indicated, a system of systems can contain multiple communications buses and the communications between the various components (LRUs) over such buses may include thousands of parameters across the various messages that the LRUs provide to one another. Such communications generally occur using electrical signals that should adhere to one or more defined electrical signal characteristics. Of course, not only communications signals have defined signal characteristics. Signals to actuators and from sensors in modern aircraft generally have an electrical specification, including, but not limited to, peak voltage, frequency, rise times, and fall times of the signals, to which the electrical signals should adhere.

Figure 1:
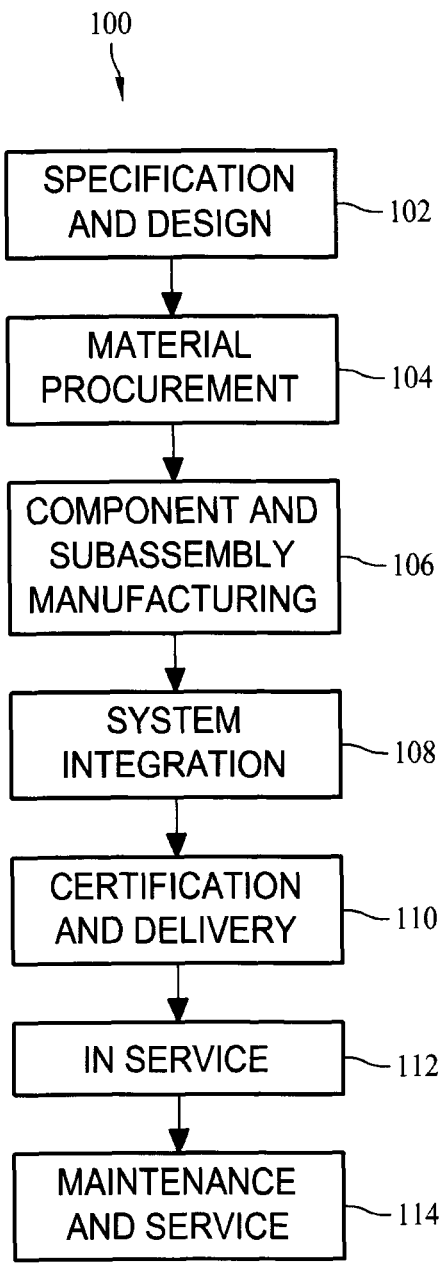
FIG. 1 is a flow diagram of an aircraft production and service methodology.
Figure 2:
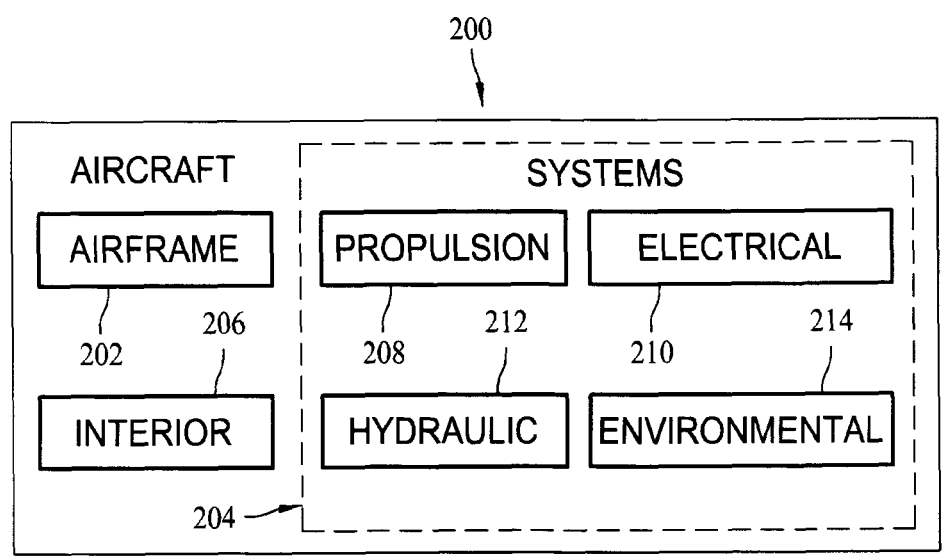
FIG. 2 is a block diagram of an aircraft.

By way of background, and referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place including the integration of many LRUs as described herein. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on) which from time to time includes replacement of faulty LRUs.

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on. Any one or multiple of these entities may be responsible for repair and/or replacement of LRUs within the platform.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example, and many of these systems are dedicated to a particular function, such as RADAR, and include one or more LRUs that are dedicated to performing the defined functions of the system, including communication of relevant data to other systems resident on a communications bus. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
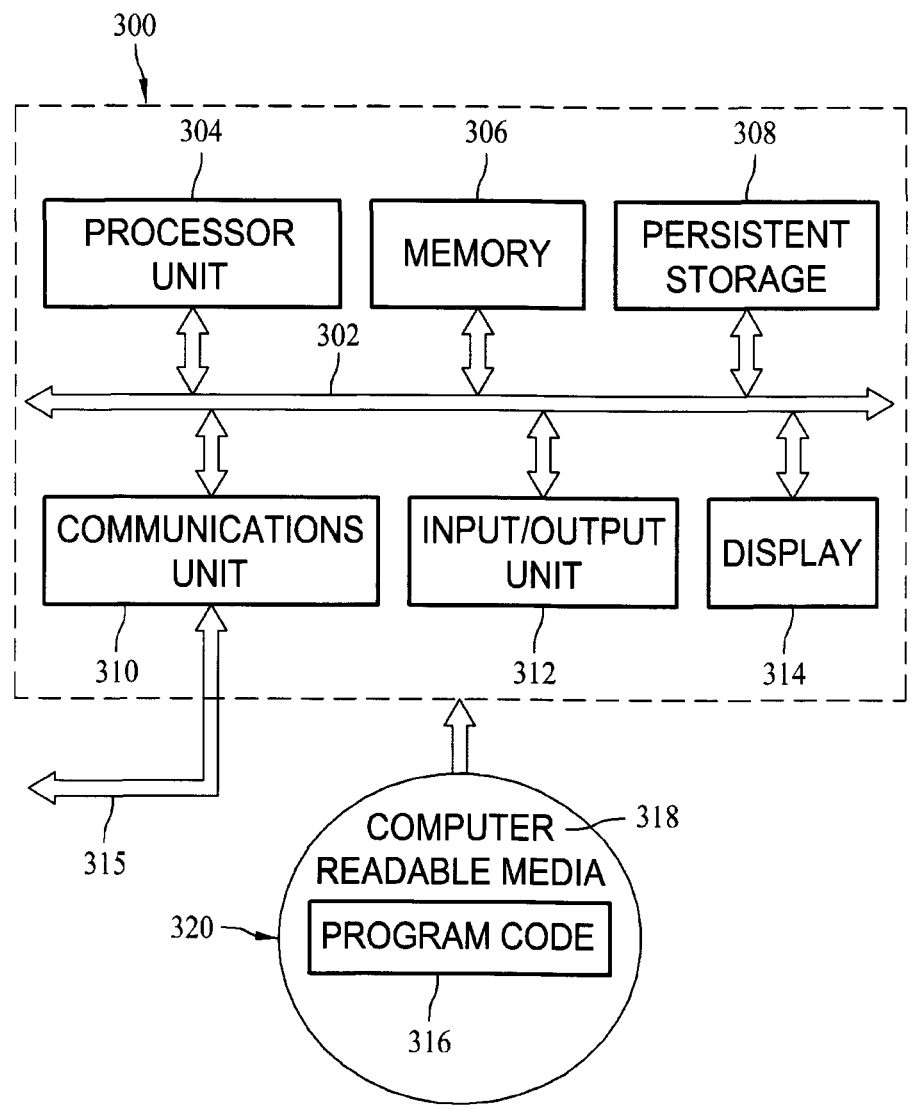
FIG. 3 is a diagram of a data processing system.

Turning now to FIG. 3, a diagram of a data processing system is depicted in accordance with an illustrative embodiment. The data processing system of FIG. 3 is but one example of a data processing system that might be deployed within an LRU. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices via an interface to external systems. In the context of the present disclosure, communications unit 310 is an interface to one or more communications buses 315 on an aircraft as described elsewhere herein. Communications unit 310 may provide communications via communications buses 315 through the use of either or both physical and wireless communication links.

Input/output unit 312 allows for input and output of data with other devices that may be connected to data processing system 300. For example, without limitation, input/output unit 312 may provide a connection for user input through a user interface, including, but not limited to, a touch display, a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over communications bus 315 to persistent storage 308 from another device or data processing system for use within data processing system 300. For instance, program code stored in a computer readable storage medium may be downloaded to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

A bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

As mentioned above, the above described system data processing system 300 is one example of a system operable for to provide the processing functions for a particular LRU. Now referring to FIG. 4, aircraft 200 includes a number of line-replaceable-units (LRUs) 400 passing data over a number of different avionics buses 402. As explained herein, each LRU 400 can include a module incorporating one or more processors for controlling and/or monitoring one or more components or subassemblies of aircraft 200. For simplicity, LRU 400 refers to any LRU shown in FIG. 4. References to specific LRUs in the following paragraphs utilize different reference numerals.

In this regard, each LRU 400 of the aircraft can be provided to monitor and/or control one or more external devices such as an actuator, valve, motor, etc., associated with a particular component or assembly of the aircraft. In addition each LRU 400 typically also generates output signals, for example, in the form of messages output onto avionics buses 402, which can be monitored to determine if the LRU 400 and/or the component with which it is associated is not properly operating. These LRUs also receive messages from the other LRUs. Specifically, each of the messages contains one or more bits of data that can be reviewed for the purpose of providing information as to the operation of the avionics and/or components coupled thereto.

The aircraft 200 can include any of a number of different LRUs 400 capable of communicating across one or more avionics buses 402. Each avionics bus, and thus the respective LRUs communicating thereon, can be configured to communicate in accordance with any of a number of different standards or protocols. In one typical embodiment, for example, a plurality of avionics buses can be configured in accordance with MIL-STD-1553, entitled: Military Standard Aircraft Internal Time Division Command/Response Multiplex Data Bus (with which its revisions and updates is incorporated by reference herein for all purposes). In such instances, as shown more particularly in FIG. 4, an example aircraft can include four flight control buses 410a-410d, two communication buses 420a, 420b, two mission buses 422a, 422b and a warning and caution system (WACS) bus 424. None, any, or all of the communications buses 402 can be MIL-STD-1553, as other communications bus protocols are known. This document refers to the communications buses 402 as MIL-STD-1553 buses for convenience only, and the disclosure should not be construed as limited to MIL-STD-1553.

Figure 4:
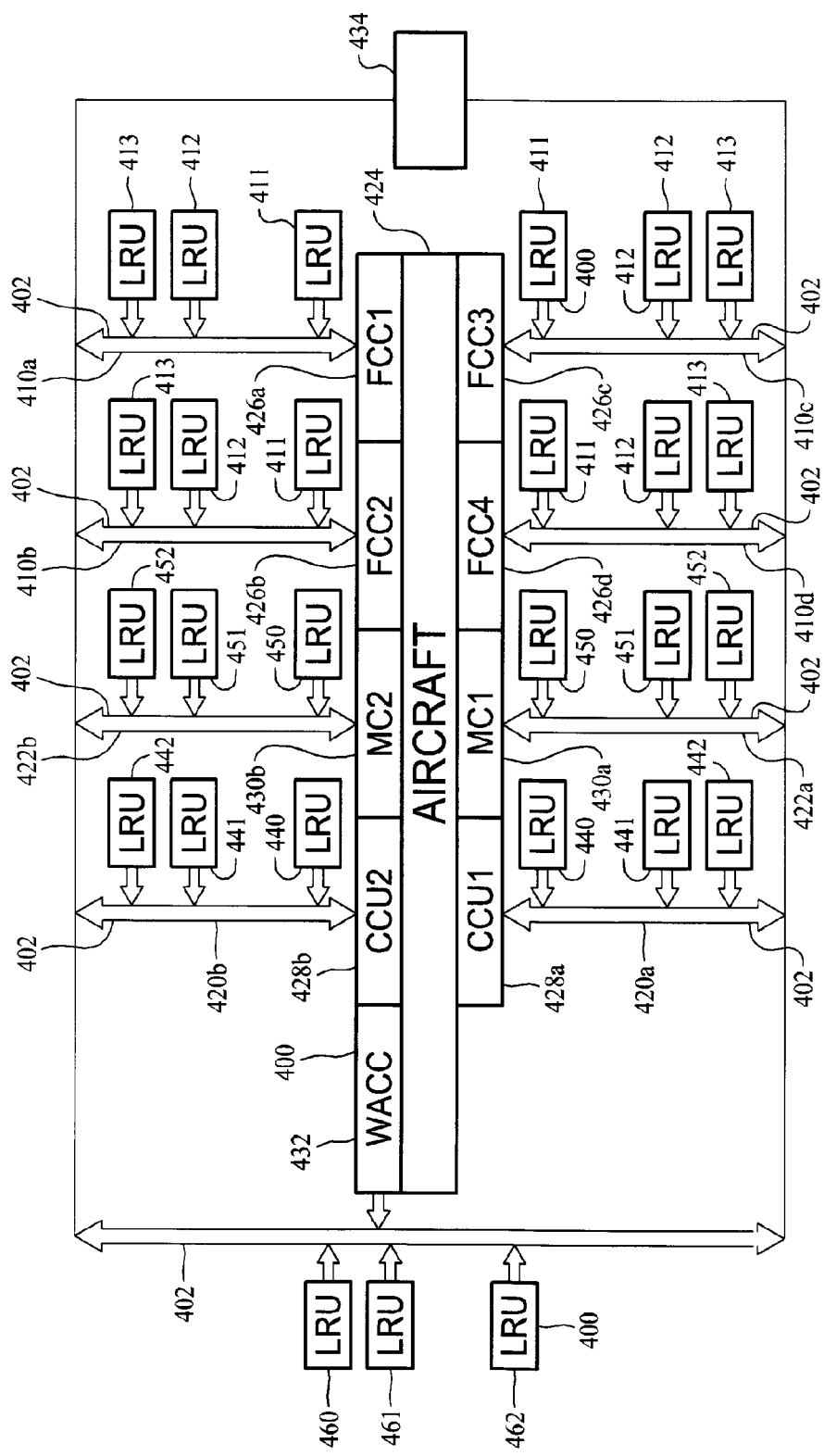
FIG. 4 is a diagram illustrating an aircraft configuration of multiple communications buses providing a communications capability for a multitude of line replaceable units.

Each MIL-STD-1553 bus 410a-410d, 420a, 420b, 422a, 422b, 424 of the aircraft 200, in turn, can include a primary and a secondary channel for transmitting signals between the various LRUs 400 and bus controller of the respective bus. In this regard, each of the LRUs 400 associated with each MIL-STD-1553 bus is considered one or both of a bus controller and a remote terminal. A single avionics bus configured in accordance with MIL-STD-1553 may support up to thirty-one separate remote terminals. For example, as shown in FIG. 4, each flight control bus 410a-410d can have an associated flight control computer (FCC) 426a-426d and a number of LRUs 411, 412, 413. Each respective FCC, which is also considered an LRU, then, can control the LRUs associated with a respective flight control bus to thereby control the primary and secondary flight surfaces of the aircraft.

Also, for example, each communication bus 420a, 420b can have an associated communication control unit (CCU)

428a, 428b and a number of LRUs 440, 441, 442. The respective CCU's, which are also considered LRUs, can control the LRUs associated with the respective buses to control functions for the Integrated Radio Management System (IRMS), including radio, intercom and public address (PA) system control. Each mission bus 422a, 422b, for example, can have an associated mission computer (MC) 430a, 430b, often referred to as a core integrated processor (CIP), and considered an LRU. The MC's can control operation of a number of LRUs 450, 451, 452 associated with the respective mission buses to provide control, display and data processing for navigation system modes and sensor management navigation capability. The MC's can also provide four-dimensional (4D) guidance of the aircraft, thrust management and data for aircraft takeoff, landing, missed approach and engine-out conditions. Further, for example, the WACS bus 424 can include an LRU referred to as a warning and caution computer WACC 432 controlling operation of a number of LRUs 460, 461, 462 associated with the WACS bus. In addition, the WACC can convert aircraft status/failure signals for display on a warning annunciator panel (WAP). It is to be understood that the architecture of FIG. 4 is but one example aircraft architecture and that communications buses in addition or instead of MIL-STD-1553 may be utilized.

It is easily understood that while such complex systems, typical testing procedures may never fully duplicate conditions that may occur during actual operation. In other words, the various systems within an aircraft architecture may exhibit a different set of characteristics during flight operations than when testing occurs on the ground due to the stresses and dynamics experienced during flight. At least in part, the currently described embodiments are directed to the gathering and analyzing of electrical signal data that may lead to an explanation of what actually occurred during flight operations that led to a particular set of circumstances noticed (or unnoticed) during a flight, and sometimes not repeatable during ground testing.

To that end, to monitor and analyze the electrical characteristics of the signals occurring on the avionics buses 402, the system of one embodiment includes a waveform quality analysis module 434 coupled to one or more of the avionics buses mentioned herein. The waveform quality analysis module 434 is therefore capable of receiving signals output from any or all of the LRUs associated with the one or more avionics buses. Thereafter, the waveform quality analysis module 434 is operable for monitoring and analyzing voltage samples of the signal waveforms and defining the electrical properties of the signal source and/or destinations along the buses to which the waveform quality analysis module 434 is communicatively coupled.

Upon completion of the analysis, waveform quality analysis module 434 is further programmed to transmit data relating to the measured electrical signal data and any subsequent analysis to a user processor 436 for subsequent presentation, further analysis, or the like.

While described herein as a separate module (e.g., waveform quality analysis module 434), the monitoring function may be incorporated as a single integrated circuit or group of ICs incorporated within one or more of the LRUs. Further, such an analysis module may be incorporated as an off board assembly coupled to a processing unit within an LRU or elsewhere. Using embedded algorithms, the WQAM evaluates the voltage samples of the signal waveforms and reports signal characteristics that may include, but is not limited to, frequency, peak voltage, rise times and fall times and the like. Those characteristics are then compared against standard defined waveform qualities and reported as meeting or not meeting the defined criteria (e.g., the specification) associated with such waveforms. Such embodiments replace and/or reduce the human requirement to form a qualitative analysis of the electrical characteristics of a monitored waveform.

In contrast to conventional techniques for testing and monitoring signal electrical characteristics, when configured as a standalone unit, the waveform quality analysis module 434 is capable of monitoring the signals output from all of the LRUs 400 associated with a greater plurality of avionics buses, such as all of the LRUs associated with the MIL-STD-1553 buses 402, 410a-410d, 420a, 420b, 422a, 422b, 424. Also in contrast to conventional techniques, if so desired, the waveform quality analysis module 434 can be configured to identify electrical signal related events as they occur, based on an immediate analysis performed on the electrical signals output by the respective LRUs 400. Such sequences may be time-based.

The software programs operating in various LRUs are dedicated to informing a flight crew of various conditions, via an indicator or a display. However, with the multitude of LRUs on modern aircraft, every possible scenario or sequence of events relating to electrical signal quality cannot be accounted for. The described embodiments provide a mechanism for real time monitoring of electrical signal quality. Such conditions that lead to electrical signal quality degradation may occur during normal flight, or may occur during maintenance operations, or even during flight testing. Having a real time analysis of electrical signal quality provides an advantage to determining the sources and/or causes of problems with electrical units and/or cabling that has manifested itself as an electrical signal that is not within a defined electrical signal specification. The real time analysis can also serve to indicate that the electrical signals received are within the defined electrical signal specification, and that no problems have been found.

Figure 5:
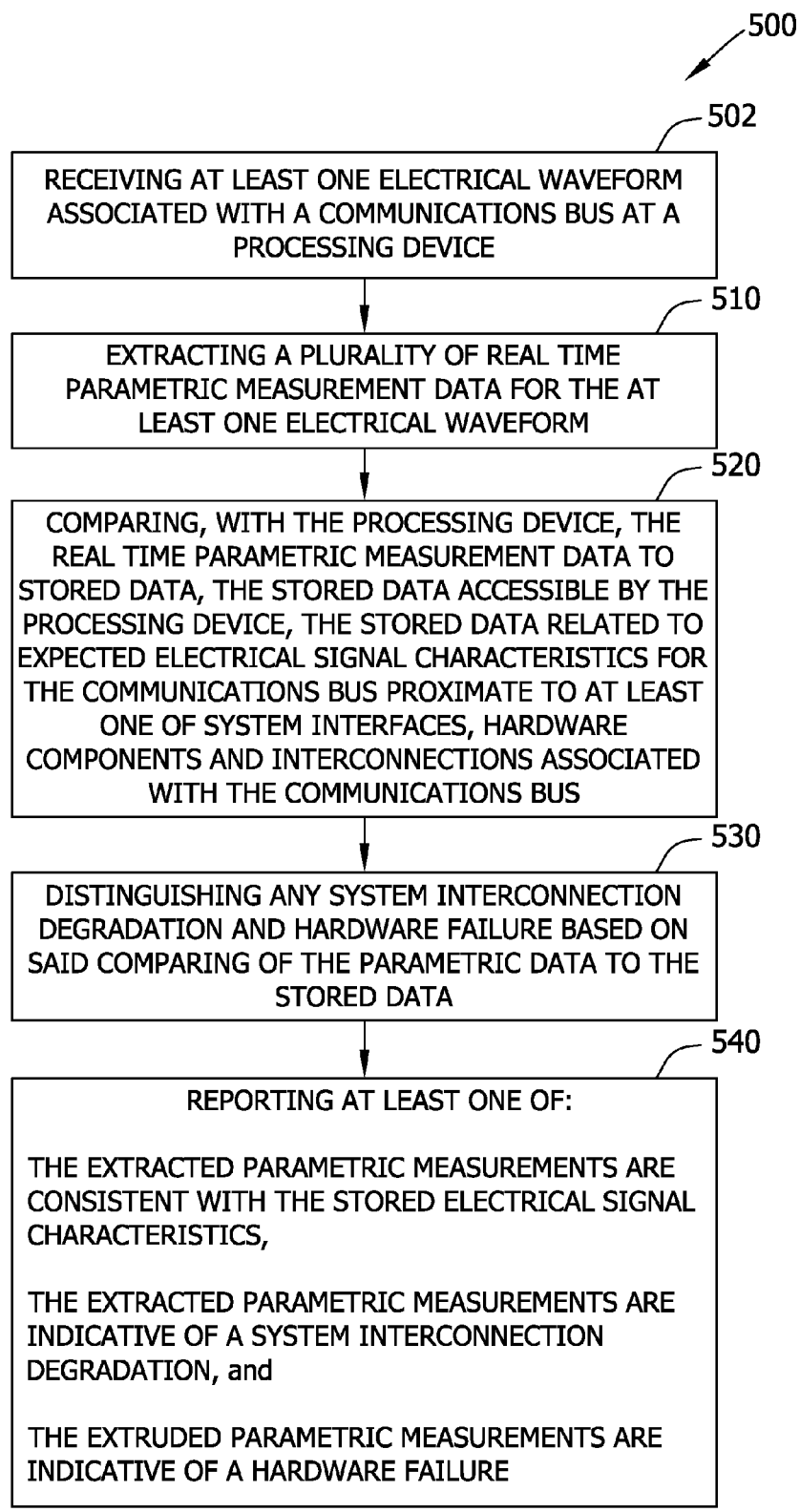
FIG. 5 is a flowchart illustrating a method for performing an integrated waveform analysis without the use of an external oscilloscope.

The described embodiments provide a method for performing an integrated waveform analysis without the use of an external oscilloscope as further illustrated by the flowchart 500 of FIG. 5. This provided method includes receiving 502, at a processing device, at least one electrical waveform associated with a communications bus and extracting 510, with the processing device a plurality of real time parametric measurements of voltage samples for the electrical waveforms. The parametric measurements are compared 520 to stored data that is accessible to the processing device, the stored data related to electrical signal levels that should be present on the communications bus proximate at least one of system interfaces, hardware components, and interconnections associated with the communications bus. Specifically, the parametric measurements is compared to stored data that is accessible to the processing device, the stored data related to expected electrical signal characteristics for the communications bus proximate at least one of system interfaces, hardware components, and interconnections associated with the communications bus.

The stored data may be in the form of a lookup table or the result of a mathematical analysis. The comparisons are utilized to distinguish 530 system interconnection degradations and hardware failures or to verify that proper electrical signals are present. The waveform data includes values of voltage with respect to time and thereby provides the ability to analyze waveform characteristics including, but not limited to: frequency, jitter, pulse width, slew rate, settling time, relative phase, noise, rise time, and fall time. The method results in the reporting 540 of at least one of a system interconnection degradation and a hardware failure or a reporting that the circuit is operating as expected (or as needed), specifically, reporting 540 at least one of extracted electrical signal parametric measurements are consistent with the stored electrical signal characteristics, electrical signal parameters are indicative of a system interconnection degradation, and electrical signal parameters are indicative of a hardware failure. More specifically, a hardware (i.e. transceiver) failure may be deduced by knowing the protocol electrical parameters are within specified tolerances, while data communication errors are present.

Real-time integrated waveform analysis to quantify, report and/or isolate signal quality or degradation thereof over time is described herein as is a method to differentiate failure modes between transceiver hardware failure and signal degradation caused by interconnection quality anomalies. Such analysis may also be utilized to report that operations are within specifications. The embodiments provide a capability to characterize waveform quality at remote terminals and elsewhere on an electrical bus such as a serial bus. Such capability also allows for the waveform quality analysis module to verify the electrical waveforms characterized are appropriate with respect to the functional specification for such buses. Problems known to exist are solved as serial data Input/Output (I/O) types such as MIL-STD-1553 and ARINC-429 cannot differentiate failure modes between transceiver hardware failures and signal degradations caused by interconnection quality anomalies. Similarly issues may exist when using EIA-232, EIAA-422, RS-485, Ethernet (802.3), DVI, and HDMI protocols as well as other protocols not listed herein. Additionally, current transceiver technology is unable to quantify, report or isolate signal quality. As such, the current diagnostic process associated electrical serial data protocols can be enhanced by the introduction of automated waveform quality analysis capability into I/O hardware implementations. The described embodiments provide the intelligence to make report on signal qualities without human intervention. In known embodiment, there is still a "human-in-the-loop" that is charged with determining a source of bus errors.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for performing an integrated waveform analysis without the use of an external device, said method comprising:
    receiving, by a quality waveform analysis module including a processing device, at least one electrical waveform associated with an electrical signal communicated from a first line replaceable unit (LRU) to a second LRU across a communications bus;
    extracting, by the quality waveform analysis module, a plurality of real time parametric measurements of waveform voltage samples relative to time of the at least one electrical waveform, wherein the real time parametric measurements are associated with a signal quality of the electrical signal and comprise one or more of the following waveform signal characteristics: frequency, peak voltage, rise times, and fall times;
    comparing, by the quality waveform analysis module, the extracted real time parametric measurements to expected waveform parametric measurements for the communications bus proximate at least one of system interfaces, hardware components, and interconnections associated with the communications bus;
    processing, by the quality waveform analysis module, differences between the extracted real time parametric measurements and the expected waveform parametric measurements to determine whether a failure mode exists on the communications bus;
    when the failure mode is determined to exist, identifying, by the quality waveform analysis module, whether a system interconnection degradation or a hardware failure caused the failure mode based on the processed differences between the real time and expected waveform parametric measurements; and
    displaying, via the quality waveform analysis module, a signal quality status indicator based on at least one of said processing and said identifying, wherein the signal quality status indicator represents the signal quality for the electrical signal and includes one or more of the following indications:
        the extracted parametric measurements of waveform voltage samples are consistent with the expected waveform parametric measurements and no failure mode has been detected,
        the failure mode exists and the parametric measurements of the waveform voltage samples are indicative of a system interconnection degradation between at least one of the first and second LRUs and the communications bus being the cause of the failure mode, and
        the failure mode exists and the parametric measurements of waveform voltage samples are indicative of a hardware failure of at least one of the first and second LRUs being the cause of the failure mode.

2. The method according to claim 1 wherein extracted real time parametric measurements further comprises one or more of the following: jitter, pulse width, slew rate, settling time, relative phase, and noise.

3. The method according to claim 1 wherein receiving, at a processing device, at least one electrical waveform comprises receiving messages transmitted between line replaceable units on an aircraft.

4. The method according to claim 1 wherein receiving, at a processing device, at least one electrical waveform comprises receiving at least one of Aeronautical Radio Incorporated 429 (ARINC-429), Military Standard Aircraft Internal Time Division Command/Response Multiplex Data Bus 1553 (MIL-STD-1553), Electronic Industries Alliance 232 (EIA-232), EIA-422, Recommended Standard 485 (RS-485), Ethernet (802.3), digital visual interface (DVI), and High-Definition Multimedia Interface (HDMI) messages at the processing device.

5. The method according to claim 1 wherein receiving, at a processing device, at least one electrical waveform comprises communicatively coupling a unit including the processing device to one or more communications buses.

6. The method according to claim 1 wherein comparing the extracted real time parametric measurements to stored data that is accessible to the processing device comprises characterizing if waveform quality output by a remote terminal is appropriate to a functional specification for a bus associated with the remote terminal.

7. The method according to claim 1 wherein receiving, at a processing device, at least one electrical waveform comprises at least one of receiving the waveform at a module embedded within a line replaceable unit and communicatively coupled to a communications bus and receiving the waveform at a standalone module communicatively coupled to a communications bus.

8. The method according to claim 1 wherein reporting, via the processing device, comprises identifying electrical signal related events as they occur.

9. A unit for analyzing electrical signal conditions associated with a communications bus, said unit comprising:
 a communications interface for communicatively coupling said unit to the communications bus;
 a storage device for storing data related to expected waveform parametric measurements the communications bus proximate at least one of system interfaces, hardware components, and interconnections associated with the communications bus, wherein parametric measurements comprise one or more of the following waveform signal characteristics: frequency, peak voltage, rise times, and fall times; and
 a quality waveform analysis module including a processing device programmed to:
  receive, via said communications interface, electrical waveforms associated with an electrical signal communicated from a first line replaceable unit (LRU) to a second LRU across the communications bus;
  extract real time parametric measurements of waveform voltage samples relative to time of the received electrical waveform;
  compare the extracted real time parametric measurements to the stored data within said storage device;
  process differences between the extracted real time parametric measurements and at least the expected waveform parametric measurements for the communications bus in the stored data to determine whether a failure mode exists, if any, associated with the communications bus;
  when the failure mode is determined to exist, identify whether a system interconnection degradation or a hardware failure caused the failure mode based on the processed differences between the real time and expected waveform parametric measurements; and
  display a signal quality status indicator based on at least one of the processed differences and the identified cause of the failure mode, wherein the signal quality status indicator represents the signal quality for the electrical signal and includes one or more of the following indications:
   the extracted parametric measurements of waveform voltage samples are consistent with the expected waveform parametric measurements and no failure mode has been detected,
   the failure mode exists and the parametric measurements of the waveform voltage samples are indicative of a system interconnection degradation between at least one of the first and second LRUs and the communications bus being the cause of the failure mode, and
   the failure mode exists and the parametric measurements of waveform voltage samples are indicative of a hardware failure of at least one of the first and second LRUs being the cause of the failure mode.

10. The unit according to claim 9 further comprising an output device operable to communicate the results of the comparison by said processing device.

11. The unit according to claim 9 wherein the parametric measurements further comprise one or more of the following: jitter, pulse width, slew rate, settling time, relative phase, and noise; and
 wherein said processing device is further programmed to compare at least one of frequency, peak voltage, jitter, pulse width, slew rate, settling time, relative phase, noise, rise time, and fall time measurements from the extracted real time parametric measurements with the expected waveform parametric measurements stored within said storage device.

12. The unit according to claim 9 wherein said communications interface is compatible with at least one of Aeronautical Radio Incorporated 429 (ARINC-429), Military Standard Aircraft Internal Time Division Command/Response Multiplex Data Bus 1553 (MIL-STD-1553), Electronic Industries Alliance 232 (EIA-232), EIA-422, Recommended Standard 485 (RS-485, Ethernet (802.3), digital visual interface (DVI), and High-Definition Multimedia Interface (HDMI).

13. The unit according to claim 9 wherein said unit is programmed to receive, via said communications interface, electrical waveforms associated with messages on a communication bus transmitted between line replaceable units on an aircraft.

14. The unit according to claim 9, said unit comprising at least one of a module embedded within a line replaceable unit of an aircraft and communicatively coupled to the communications bus and a standalone module communicatively coupled to the communications bus.

15. The unit according to claim 9 wherein said unit is programmed to determine if waveform quality of an electrical waveform output by a remote terminal onto a communications bus is appropriate to a functional specification for the communications bus associated with the remote terminal.

16. The unit according to claim 9 further comprising an interface to an external device, said unit programmed to identify electrical signal related events as they occur via said interface to the external device.

17. A method, comprising:
 receiving, by a quality waveform analysis module including a processing device, electrical signals associated with communications between at least two systems across a communications bus;
 comparing, by the quality waveform analysis module, electrical waveform parametric measurements of waveform voltage samples relative to time of the received electrical signals with expected electrical waveform parametric measurements of waveform voltage samples relative to time stored in a memory associated with the processing device to determine signal qualities for each of the electrical signals, wherein parametric measurements comprise one or more of the following waveform signal characteristics: frequency, peak voltage, rise times, and fall times;
 processing, by the quality waveform analysis module, a difference between the parametric measurements of the received electrical signals and the expected electrical waveform parametric measurements stored in the memory and a functional specification for the communications bus to determine whether a failure mode exists on the communications bus;
 when the failure mode is determined to exist, identifying, by the quality waveform analysis module, whether a system interconnection degradation or a hardware failure caused the failure mode based on the processed differences between the parametric measurements and the expected waveform parametric measurements; and displaying, on an external device, a plurality of signal quality status indicators based on at least one of the processing and the identifying, wherein the plurality of signal quality status indicators represent the signal qualities for the plurality of electrical signals and include one or more of the following indications:

the extracted parametric measurements of waveform voltage samples are consistent with the expected waveform parametric measurements and no failure mode has been detected, the failure mode exists and the parametric measurements of the waveform voltage samples are indicative of a system interconnection degradation between at least one of the systems and the communications bus being the cause of the failure mode, and the failure mode exists and the parametric measurements of waveform voltage samples are indicative of a hardware failure of at least one of the systems being the cause of the failure mode.

18. The method according to claim 17 wherein the parametric measurements further comprise one or more of the following: jitter, pulse width, slew rate, settling time, relative phase, and noise; and wherein comparing comprises comparing at least one of the expected electrical waveform parametric measurements with at least one of the parametric measurements of the received electrical signals.

* * * * *

UNITED STATES PATENT AND TRADEMARK OFFICE
CERTIFICATE OF CORRECTION

PATENT NO. : 9,691,191 B1
APPLICATION NO. : 13/030975
DATED : June 27, 2017
INVENTOR(S) : Righi et al.

It is certified that error appears in the above-identified patent and that said Letters Patent is hereby corrected as shown below:

In Claim 12, Column 12, Line 18, delete "(RS-485, Ethernet (802.3), digital" and insert therefor -- (RS-485), Ethernet (802.3), digital --.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*